US011085839B2

(12) United States Patent
Suzuki et al.

(10) Patent No.: US 11,085,839 B2
(45) Date of Patent: Aug. 10, 2021

(54) TORQUE SENSOR CAPABLE OF INDEPENDENTLY SETTING THE SENSITIVITY AND ALLOWANCE TORQUE OF A STRAIN SENSOR

(71) Applicant: NIDEC COPAL ELECTRONICS CORPORATION, Tokyo (JP)

(72) Inventors: Takashi Suzuki, Sano (JP); Takao Ikeda, Sano (JP)

(73) Assignee: NIDEC COPAL ELECTRONICS CORPORATION, Tokyo (JP)

( * ) Notice: Subject to any disclaimer, the term of this patent is extended or adjusted under 35 U.S.C. 154(b) by 64 days.

(21) Appl. No.: 16/393,021

(22) Filed: Apr. 24, 2019

(65) Prior Publication Data

US 2019/0250051 A1 Aug. 15, 2019

Related U.S. Application Data

(63) Continuation of application No. PCT/JP2017/035633, filed on Sep. 29, 2017.

(30) Foreign Application Priority Data

Dec. 7, 2016 (JP) .............................. JP2016-237778

(51) Int. Cl.
*G01L 3/10* (2006.01)
*B25J 13/08* (2006.01)
(Continued)

(52) U.S. Cl.
CPC ............. *G01L 3/108* (2013.01); *B25J 13/085* (2013.01); *B25J 19/02* (2013.01); *G01L 3/10* (2013.01); *G01L 5/0061* (2013.01)

(58) Field of Classification Search
CPC ......... G01L 3/10; G01L 3/108; G01L 5/0061; B25J 13/085; B25J 19/02
(Continued)

(56) References Cited

U.S. PATENT DOCUMENTS 5,648,617 A * 7/1997 Cullen .................. G01L 1/2231
73/862.042
6,038,933 A * 3/2000 Meyer .................. G01L 1/2206
73/146
(Continued)

FOREIGN PATENT DOCUMENTS

CN 1914493 2/2007
CN 103076131 5/2013
(Continued)

OTHER PUBLICATIONS

International Search Report for International Application PCT/JP2017/035633, dated Dec. 19, 2017.
(Continued)

*Primary Examiner* — Octavia Hollington
(74) *Attorney, Agent, or Firm* — Burris Law, PLLC

(57) ABSTRACT

Provided is a torque sensor which enables the allowable torque and sensitivity of a strain sensor to be independently set, or for which the mechanical strength can be independently set. The torque sensor comprises a first region, a second region, and a plurality of third regions which connect the first and second regions, wherein the torque to be measured is transmitted between the first and second regions through the third regions. A first strain generation part is provided between the first region and the second region, and is equipped with a first resistor. A second strain generation part is provided between the first region and the second region at a location separated from the first strain generation part, and is equipped with a second resistor.

13 Claims, 7 Drawing Sheets

(51) Int. Cl.
*G01L 5/00* (2006.01)
*B25J 19/02* (2006.01)

(58) Field of Classification Search
USPC ..................................... 73/862.331–862.338
See application file for complete search history.

(56) References Cited

U.S. PATENT DOCUMENTS

| | | | |
|---|---|---|---|
| 7,520,182 B2* | 4/2009 | Takamura | G01L 3/1457 |
| | | | 73/862.08 |
| 7,743,672 B2* | 6/2010 | Kurtz | G01L 5/162 |
| | | | 73/862.046 |
| 10,520,380 B2* | 12/2019 | Li | G01L 1/2206 |
| 2006/0037409 A1 | 2/2006 | Ichige | |
| 2007/0180931 A1 | 8/2007 | Takamura et al. | |
| 2009/0301217 A1 | 12/2009 | Kurtz et al. | |
| 2017/0266814 A1 | 9/2017 | Uemura et al. | |
| 2020/0348195 A1* | 11/2020 | Endo | G01L 3/108 |

FOREIGN PATENT DOCUMENTS

| | | |
|---|---|---|
| CN | 104048791 | 9/2014 |
| CN | 105973515 | 9/2016 |
| EP | 1719991 | 11/2006 |
| EP | 2322905 | 5/2011 |
| JP | 2005249772 | 9/2005 |
| JP | 2007187596 | 7/2007 |
| JP | 2013096735 | 5/2013 |
| JP | 5640905 | 12/2014 |
| JP | 2015049209 | 3/2015 |
| JP | 2017172983 | 9/2017 |
| WO | 2005075950 | 8/2005 |

OTHER PUBLICATIONS

Supplementary European Search Report issued in corresponding European Patent Application No. 17 87 937.8, dated Jul. 22, 2020.
First Office Action issued in corresponding Chinese Patent Application No. 2017800688761, dated Jun. 29, 2020.
Office Action Issue in Corresponding Japanese Patent Application No. 2016-237778, dated Aug. 4, 2020.

* cited by examiner

| | Execution of application of torque | Execution of application of thrust force | Give temperature variation $\Delta T$ to only R1 and R2 | R1 | R2 | R3 | R4 | Vout calculation result |
|---|---|---|---|---|---|---|---|---|
| (1) | — | — | — | R | R | R | R | 0 |
| (2) | ○ | — | — | $R-\Delta R$ | $R+\Delta R$ | $R+\Delta R$ | $R-\Delta R$ | $-\Delta R/R \cdot V_0$ |
| (3) | — | ○ | — | $R-\Delta R$ | $R+\Delta R$ | $R-\Delta R$ | $R+\Delta R$ | 0 |
| (4) | — | — | ○ | $R \cdot (1+\alpha \cdot \Delta T)$ | $R \cdot (1+\alpha \cdot \Delta T)$ | R | R | 0 |
| (5) | ○ | — | ○ | $(R-\Delta R) \cdot (1+\alpha \cdot \Delta T)$ | $R+\Delta R$ | $R+\Delta R$ | $R-\Delta R$ | $-\Delta R/R \cdot V_0$ |
| (6) | — | ○ | ○ | $(R-\Delta R) \cdot (1+\alpha \cdot \Delta T)$ | $R+\Delta R$ | $R-\Delta R$ | $R+\Delta R$ | 0 |

F I G. 10

TORQUE SENSOR CAPABLE OF INDEPENDENTLY SETTING THE SENSITIVITY AND ALLOWANCE TORQUE OF A STRAIN SENSOR

CROSS-REFERENCE TO RELATED APPLICATIONS

This application is a continuation of International Application No. PCT/JP2017/035633, filed on Sep. 29, 2017, which claims priority to and the benefit of JP 2016-237778 filed on Dec. 7, 2016. The disclosures of the above applications are incorporated herein by reference.

FIELD

The present disclosure relates generally to a torque sensor provided at, for example, a joint of a robot arm.

BACKGROUND

The statements in this section merely provide background information related to the present disclosure and may not constitute prior art.

The torque sensor of this type comprises a first structure to which a torque is applied, a second structure from which a torque is output, and a plurality of strain generation parts that connects the first structure and the second structure, and a strain sensor is disposed in these strain generation parts (see, for example, Patent Literature 1 (JP 2013-096735 A), Patent Literature 2 (JP 2015-049209 A), and Patent Literature 3 (JP 5640905 B)).

SUMMARY

In the torque sensor, it has been difficult to set independently the sensitivity and the allowable torque (maximum torque) of the strain sensor, or the mechanical strength of the torque sensor.

Embodiments of the present invention provide a torque sensor capable of independently setting the sensitivity and the allowable torque of the strain sensor or the mechanical strength of the torque sensor.

The torque sensor of the present embodiments comprises a first region, a second region, and a plurality of third regions connecting the first region and the second region, and a torque to be measured is transmitted between the first region and the second region via the third region, and the torque sensor comprises a first strain generation part provided between the first region and the second region and provided with a first resistor, and a second strain generation part provided at a position separate from the first strain generation part, between the first region and the second region, and provided with a second resistor, wherein the first strain generation part comprises a first protrusion protruding from the first region, a second protrusion protruding from the second region, and a first strain body provided with the first resistor connecting the first protrusion and the second protrusion; and the second strain generation part comprises a third protrusion protruding from the first region, a fourth protrusion protruding from the second region, and a second strain body provided with the second resistor connecting the third protrusion and the fourth protrusion.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

DRAWINGS

The accompanying drawings, which are incorporated in and constitute a part of the specification, illustrate embodiments of the invention, and together with the general description given above and the detailed description of the embodiments given below, serve to explain the principles of the invention.

Figure 7:
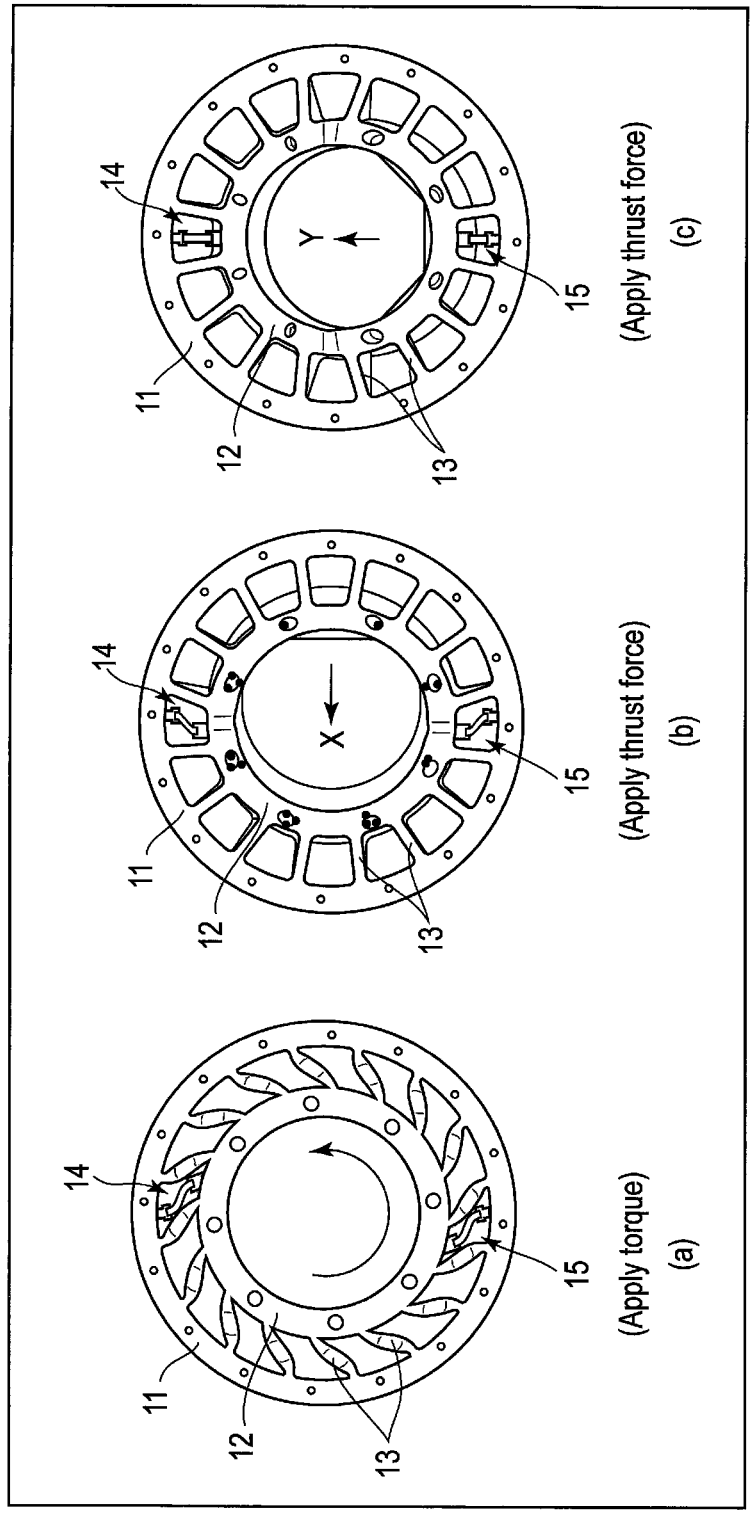

FIGS. 7(a), 7(b), and 7(c) are views illustrating different operations of the torque sensor of the embodiments.

Figure 8:
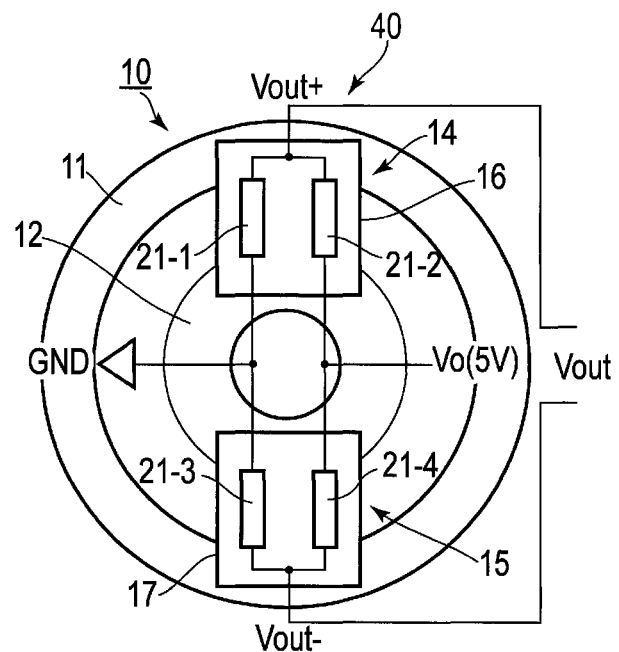

FIG. 8 is a view showing an example of a bridge circuit applied to the torque sensor of the present embodiments.

Figure 9:
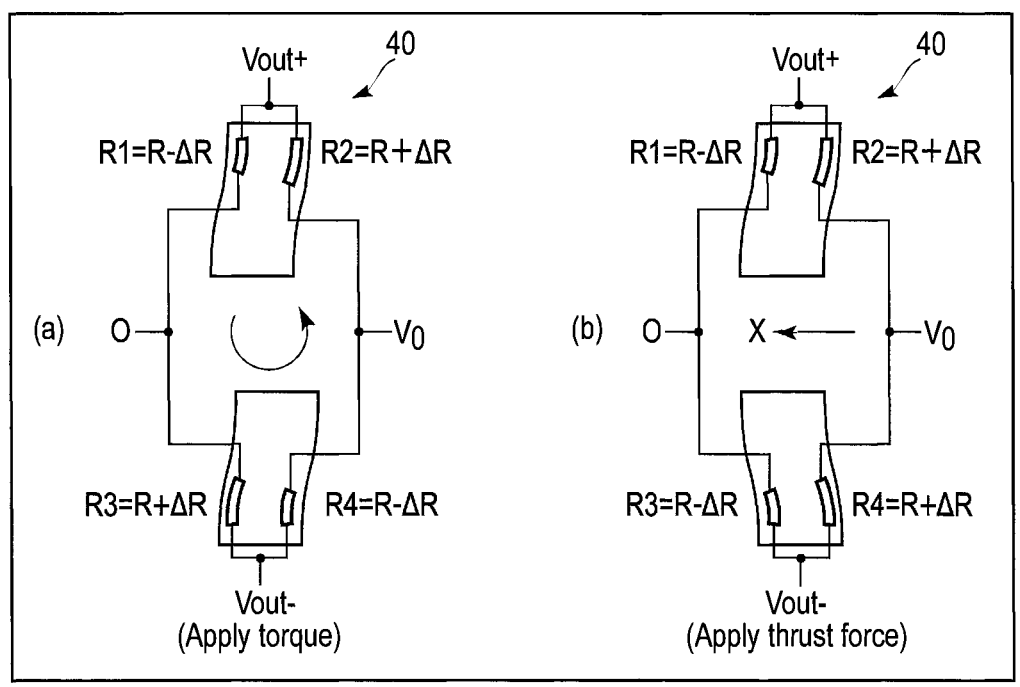

FIGS. 9(a) and 9(b) are diagrams illustrating operations of a bridge circuit.

FIG. 10 is a table illustrating output voltages in different operation conditions of the bridge circuit.

DETAILED DESCRIPTION

Embodiments will be described hereinafter with reference to the accompanying drawings. In the drawings, the same parts are denoted by the same reference numerals.

Figure 1:
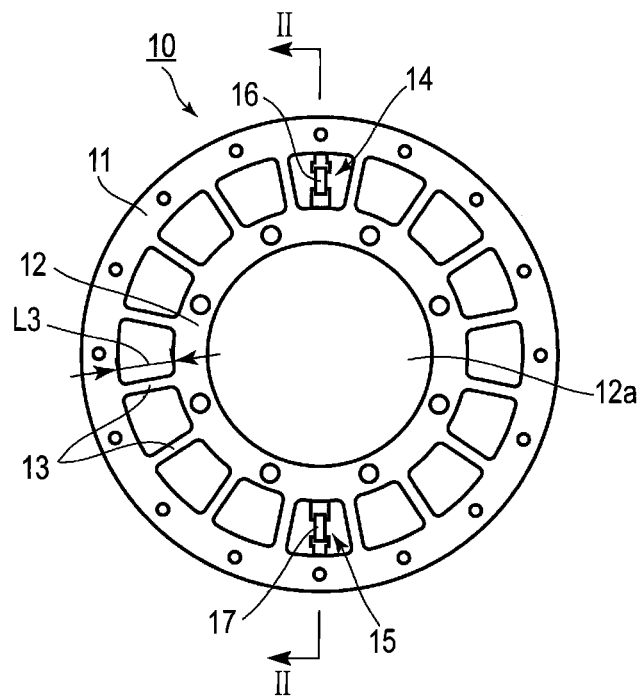
FIG. 1 is a plan view showing a torque sensor according to the embodiments.
Figure 2:
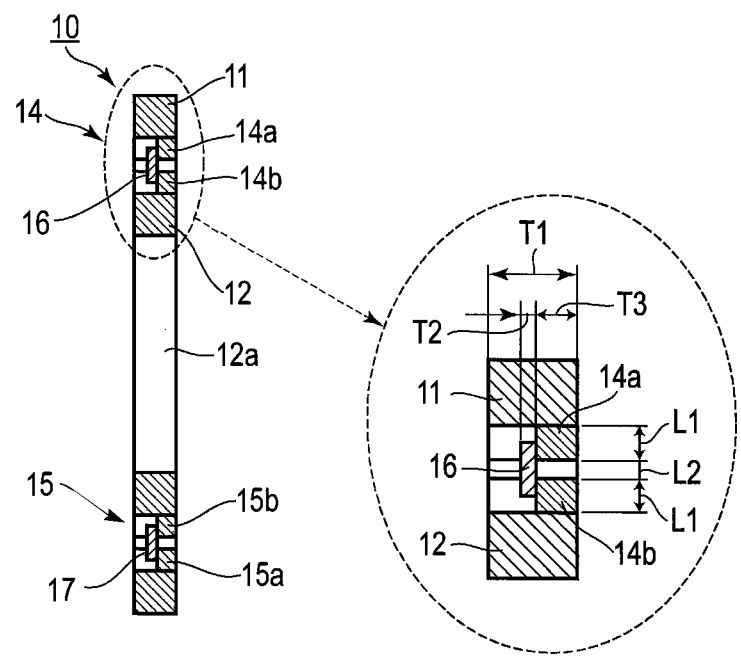
FIG. 2 is a cross-sectional view seen along line II-II of FIG. 1.

In FIG. 1 and FIG. 2, a torque sensor 10 comprises a first structure (first region) 11, a second structure 12 (second region), a plurality of beams (third regions) 13, a first strain generation part 14, and a second strain generation part 15. The first structure 11, the second structure 12, the plurality of beams 13, the first strain generation part 14, and the second strain generation part 15 are formed of, for example, metal, but can be formed by using materials other than metal if a mechanical strength can be sufficiently obtained to the applied torque.

The first structure 11 to which the torque is applied and the second structure 12 from which the torque is output have an annular shape. A diameter of the second structure 12 is smaller than a diameter of the first structure 11. The second structure 12 is disposed concentrically with the first structure 11, and the first structure 11 and the second structure 12 are connected by the plurality of beams 13 radially arranged, the first strain generation part 14, and the second strain generation part 15. In addition, the second structure 12 also includes a hollow portion 12a.

The first strain generation part 14 and the second strain generation part 15 are arranged at positions symmetrical with respect to the centers of the first structure 11 and the second structure 12 (the center of action of the torque).

As shown in FIG. 2, the first strain generation part 14 comprises a first protrusion 14a, a second protrusion 14b, and a first strain body 16. The first protrusion 14a protrudes from the first structure 11, and the second protrusion 14b protrudes from the second structure 12. A first gap is provided between the first protrusion 14a and the second protrusion 14b, and the first protrusion 14a and the second protrusion 14b are connected by the first strain body 16. The first strain body 16 comprises, for example, a plurality of strain sensors (hereinafter, referred to as strain gauges) as resistors to be described later.

The second strain generation part 15 comprises a third protrusion 15a, a fourth protrusion 15b, and a second strain body 17. The third protrusion 15a protrudes from the first structure 11, and the fourth protrusion 15b protrudes from the second structure 12. A second gap is provided between the third protrusion 15a and the fourth protrusion 15b, and the third protrusion 15a and the fourth protrusion 15b are connected by the second strain body 17. The second strain body 17 comprises, for example, a plurality of strain gauges as resistors to be described later.

The first structure 11, the second structure 12, and the beams 13 have a first thickness T1, and the first strain generation part 14 and the second strain generation part 15 have a second thickness T2 smaller than the first thickness T1. The substantial thicknesses (second thickness T2) for obtaining the rigidity of the first strain generation part 14 and the second strain generation part 15 correspond to the thicknesses of the first strain body 16 and the second strain body 17, respectively. More specifically, when the first thickness T1 is, for example, 10 mm, the second thickness T1 is, for example, approximately 0.7 mm.

The strength of the beams 13 is defined by the width of the beams 13 if the thicknesses of the first structure 11 and the second structure 12 are assumed to be equal. A substantial rotation angle of the first structure 11 to the second structure 12 is determined based on the plurality of beams 13 in accordance with the torque applied to the first structure 11.

In addition, strain generated in the first strain generation part 14 and the second strain generation part 15 in accordance with the rotation angle of the first structure 11 to the second structure 12 is detected by the plurality of strain gauges provided in the first strain body 16 and the second strain body 17.

The thickness of the first protrusion 14a, the second protrusion 14b, the third protrusion 15a, and the fourth protrusion 15b are set to, for example, a third thickness T3 which is smaller than the first thickness T1 and larger than the second thickness T2. The thickness of the first protrusion 14a, the second protrusion 14b, the third protrusion 15a, and the fourth protrusion 15b to the thickness T1 of the first structure 11 and the second structure 12 is variable. The sensitivity of the torque sensor 10 can be adjusted by adjusting the thicknesses T1, T2, and T3.

Each of the length of the first protrusion 14a and the second protrusion 14b of the first strain generation part 14 and the length of the third protrusion 15a and the fourth protrusion 15b of the second strain generating part 15 is set to L1, and each of length L2 of a first gap provided between the first protrusion 14a and the second protrusion 14b and length L2 of a second gap provided between the third protrusion 15a and the fourth protrusion 15b of the second strain generation part 15 is set to be shorter than L1. Furthermore, the total length of the first protrusion 14a and the second protrusion 14b and the total length of the third protrusion 15a and the fourth protrusion 15b, that is, 2×L1 are shorter than length L3 of each of the plurality of beams 13 (FIG. 2 shows only the lengths L1 and L2 on the first strain generation part 14 side, but L3 is not shown).

When the torque is applied to the first structure 11, the amount of strain generated in the first strain generation part 14 and the second strain generation part 15 can be adjusted by adjusting these lengths L1, L2, and L3. More specifically, the length L2 of the first gap and the length L2 of the second gap are shorter than the length L1 of the first protrusion 14a, the second protrusion 14b, the third protrusion 15a, and the fourth protrusion 15b, and the first length L1 of the first protrusion 14a, the second protrusion 14b, the third protrusion 15a, and the fourth protrusion 15b is shorter than the length L3 of the plurality of beams 13. For this reason, when the torque is applied to the first structure 11, the amount of strain of the first strain generation part 14 and the second strain generation part 15 becomes larger than the amount of strain of the beams 13. Therefore, a bridge circuit to be described later can obtain a large gain.

In addition, the allowable torque (maximum torque) and mechanical strength of the torque sensor 10 can be set based on, for example, the thickness and width of the first structure 11, the second structure 12 and the plurality of beams 13, independently of the first strain generation part 14 and the second strain generation part 15.

Furthermore, the sensitivity of the torque sensor 10 can be set by the thickness of the first strain body 16 and the second strain body 17.

Figure 3:
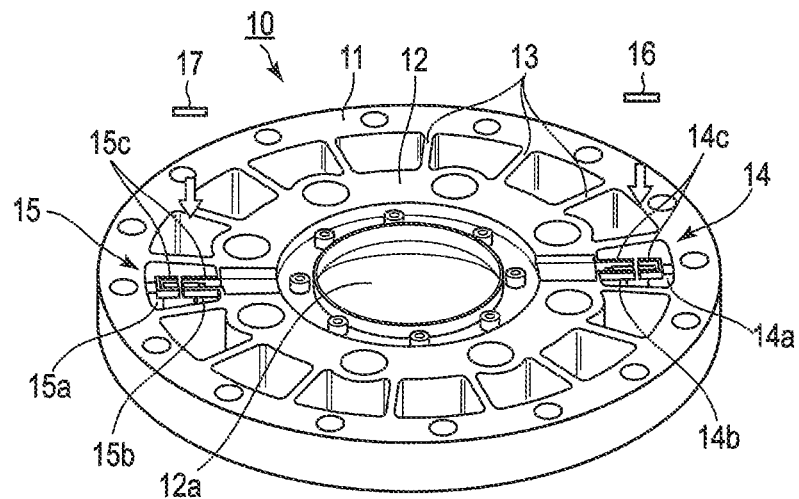
FIG. 3 is an exploded perspective view showing the torque sensor shown in FIG. 1.
Figure 4:
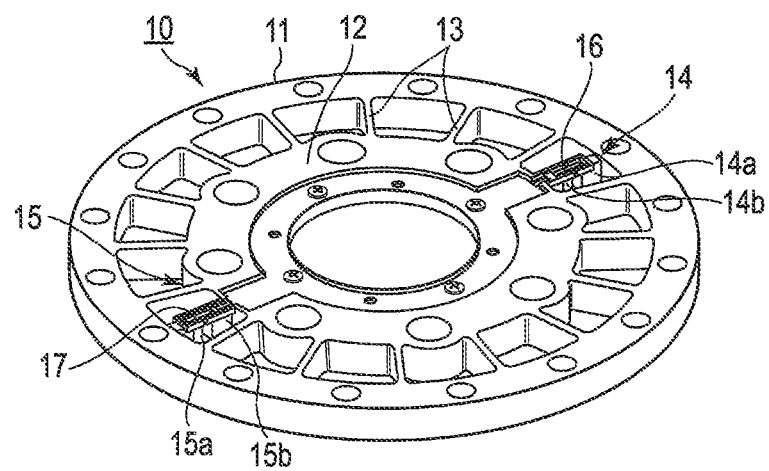
FIG. 4 is a perspective view showing an assembled state of the torque sensor shown in FIG. 3.

FIG. 3 and FIG. 4 specifically show the first strain generation part 14 and the second strain generation part 15. The first strain generation part 14 includes a first accommodation part 14c for accommodating the first strain body 16, and the second strain generation part 15 includes a second accommodation part 15c for accommodating the second strain body 17. The first accommodation part 14c positions the first strain body 16 with respect to the first strain generation part 14, and the second accommodation part 15c positions the second strain body 17 with respect to the second strain generation part 15. The first accommodation part 14c is constituted by a substantially frame-shaped projection provided on the first projection 14a and the second projection 14b, and the second accommodation part 15c is constituted by a substantially frame-shaped projection provided on the third protrusion 15a and the fourth protrusion 15b. The first accommodation part 14c includes a gap corresponding to the gap between the first projection 14a and the second projection 14b, and the second accommodation part 15c includes a gap corresponding to the gap between the third protrusion 15a and the fourth protrusion 15b.

As shown in FIG. 3, the first strain body 16 and the second strain body 17 are accommodated in the first accommodation part 14c and the second accommodation part 15c from the upper sides of the first accommodation part 14c and the second accommodation part 15c, respectively. As shown in FIG. 4, the first straining body 16 is fixed to the first projection 14a and the second projection 14b by, for example, welding, in a state in which the first strain body 16 and the second strain body 17 are accommodated in the first accommodation part 14c and the second accommodation part 15c, respectively. In addition, the second strain body 17 is fixed to the third protrusion 15a and the fourth protrusion 15b by, for example, welding. The method of fixing the first strain body 16 and the second strain body 17 is not limited to welding, but may be a method of fixing the first strain body 16 and the second strain body 17 to the first to fourth protrusions 14a to 15b with strength sufficient to the torque applied to the first strain body 16 and the second strain body 17. Wirings (not shown) of the first strain body 16 and the second strain body 17 are covered with an insulating member 32 (shown in FIG. 6).

Figure 5:
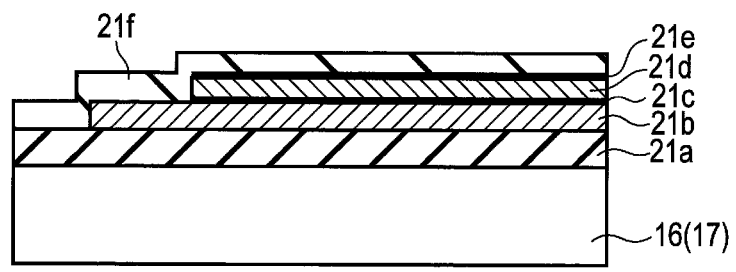
FIG. 5 is a cross-sectional view showing an example of a resistor.

FIG. 5 shows an example of a strain gauge 21 provided on the first strain body 16 and the second strain body 17, and shows a cross-section of an end portion of the strain gage 21. The strain gauge 21 comprises, for example, an insulating film 21a, a thin film resistor (strain sensitive film) 21b, an adhesive film 21c, a wiring 21d, an adhesive film 21e, and a glass film 21f serving as a protective film. For example, the insulating film 21a is provided on the first strain body 16 (second strain body 17) formed of metal, and the thin film resistor 21b composed of, for example, a Cr—N resistor is provided on the insulating film 21a. The thin film resistor 21b may have a linear shape, a shape bent at plural times, etc. A wiring 21d serving as an electrode lead formed of, for example, copper (Cu) is provided on the end of the thin film resistor 21b via an adhesive film 21c. The adhesive film 21e is provided on the wiring 21d. The insulating film 21a, the thin film resistor 21b, and the adhesive film 21e are covered with the glass film 21f. The adhesive film 21c enhances the adhesion between the wiring 21d and the thin film resistor 21b, and the adhesive film 21e enhances the adhesion between the wiring 21d and the glass film 21f. The adhesive films 21c and 21e are films containing, for example, chromium (Cr). The configuration of the strain gauge 21 is not limited to this.

Each of the first strain body 16 and the second strain body 17 comprises, for example, two strain gauges 21 shown in FIG. 5, and a bridge circuit to be described later is constituted by four strain gauges 21.

Figure 6:
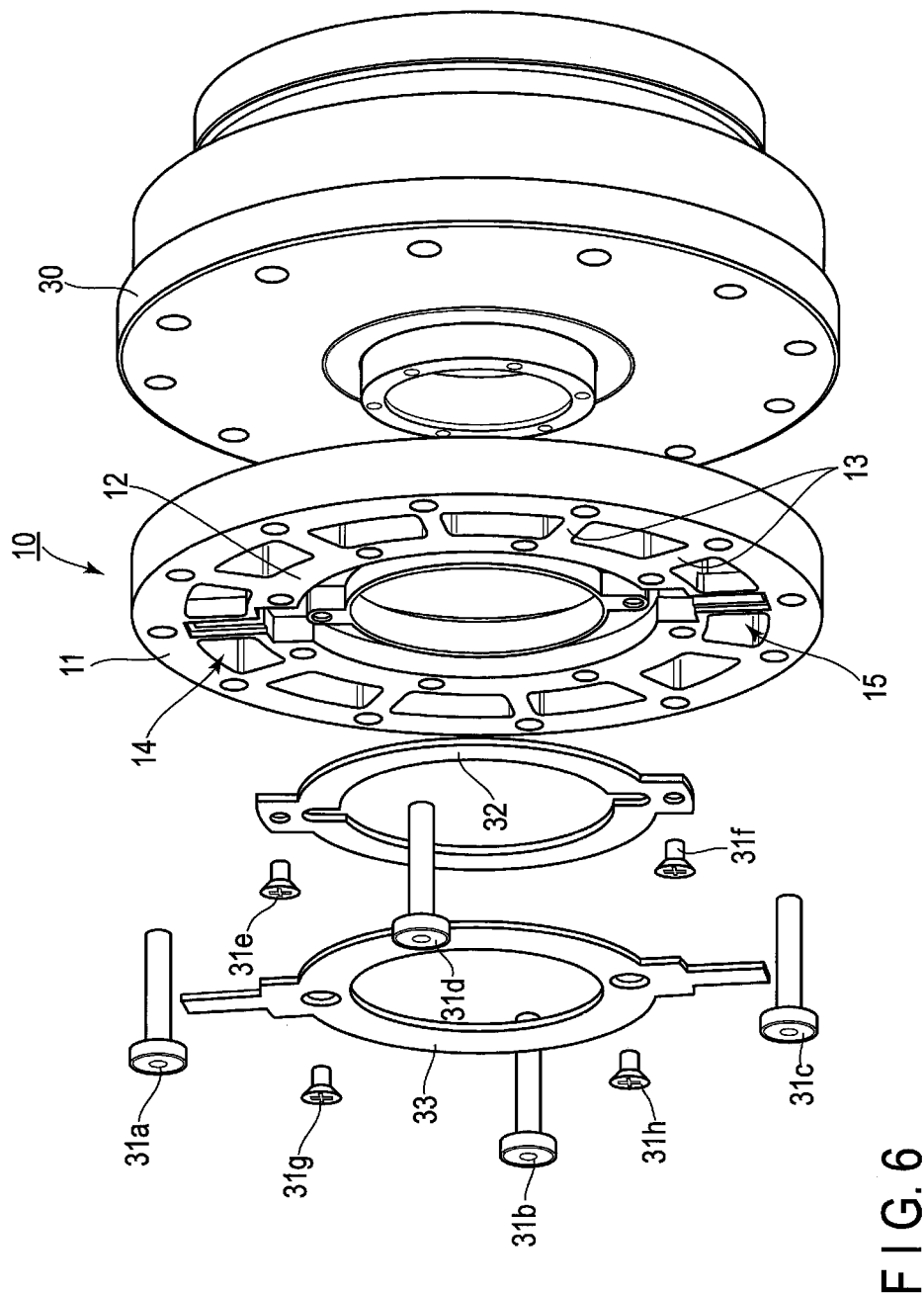
FIG. 6 is a perspective view showing a relationship between the torque sensor shown in FIG. 1 and a joint of a robot.

FIG. 6 shows the relationship between the torque sensor 10 and, for example, a speed reducer 30 provided at one of the joints of the robot. The first structure 11 of the torque sensor 10 is attached to the speed reducer 30 by bolts 31a, 31b, 31c, and 31d. The speed reducer 30 is connected to a motor (not shown). The insulating member 32 is attached to the second structure 12 of the torque sensor 10 by the bolts 31e and 31f. The insulating member 32 covers lead wirings of a plurality of strain gauges 21 (not shown). The insulating member 32, the first strain generation part 14, and the second strain generation part 15 are covered with a lid 33. The lid 33 is attached to the second structure 12 by bolts 31g and 31h. Furthermore, the second structure 12 is attached to, for example, the other of joints of a robot (not shown).

FIG. 7(a), FIG. 7(b), and FIG. 7(c) show the operation of the torque sensor 10, and FIG. 7(a) shows a case where the torque is applied to the first structure 11, FIG. 7(b) shows a case where a thrust force is applied to the first structure 11 in the X-axis direction in the figure, and FIG. 7(c) shows a case where a thrust force is applied to the first structure 11 in the Y-axis direction in the figure.

As shown to FIG. 7(a), when the torque is applied to the first structure 11, the plurality of beams 13, the first strain generation part 14 and the second strain generation part 15 are elastically deformed, and the first structure 11 is pivoted relative to the second structure 12. The balance of a bridge circuit to be described later is lost and the torque is detected in accordance with the elastic deformation of the first strain generation part 14 and the second strain generation part 15.

As shown in FIG. 7(b), when the thrust force is applied to the first structure 11 in the X-axis direction, the plurality of beams 13, the first strain generation part 14 and the second strain generation part 15 are elastically deformed, and the first structure 11 is moved in the X-axis direction with respect to the second structure 12. The balance of the bridge circuit is lost due to the elastic deformation of the first strain generation part 14 and the second strain generation part 15. As described later, however, the torque and the thrust force are not detected.

As shown in FIG. 7(c), when the thrust force is applied to the first structure 11 in the Y-axis direction shown in the figure, the plurality of beams 13, the first strain generation part 14, and the second strain generation part 15 are elastically deformed, and the first structure 11 is moved in the Y-axis direction with respect to the second structure 12. The balance of the bridge circuit is lost due to the elastic deformation of the first strain generation part 14 and the second strain generation part 15. As described later, however, the torque and the thrust force are not detected.

FIG. 8 schematically shows a bridge circuit 40 provided in the present torque sensor 10. As described above, each of the first strain body 16 of the first strain generation part 14 and the second strain body 17 of the second strain generation part 15 comprises two strain gauges 21. More specifically, the first strain body 16 comprises strain gauges 21-1 and 21-2, and the second strain body 17 comprises strain gauges 21-3 and 21-4. The first strain body 16 and the second strain body 17 are arranged symmetrically with respect to the centers of the first structure 11 and the second structure 12, and the strain gauges 21-1 and 21-2 and the strain gauges 21-3 and 21-4 are also arranged symmetrically with respect to the centers of the first structure 11 and the second structure 12.

In the bridge circuit 40, the strain gauges 21-1 and 21-3 are connected in series, and the strain gauges 21-2 and 21-4 are connected in series. The strain gauges 21-1 and 21-3 connected in series are connected in parallel to the strain gauges 21-2 and 21-4 connected in series. A power source Vo, for example, 5V, is supplied to a connection point of the strain gauges 21-2 and 21-4, and a connection point of the strain gauges 21-1 and 21-3 is, for example, grounded. An output voltage Vout+ is output from a connection point of the strain gauges 21-1 and 21-2, and an output voltage Vout− is output from a connection point of the strain gauges 21-3 and 21-4. An output voltage Vout of the torque sensor 10 represented by equation (1) is obtained from the output voltage Vout+ and the output voltage Vout−.

$$Vout = (Vout+ - Vout-) = (R1/(R1 + R2) - R3/(R3 + R4)) \cdot Vo \quad (1)$$

where
R1 is a resistance value of the strain gauge 21-1,
R2 is a resistance value of the strain gauge 21-2,
R3 is a resistance value of the strain gauge 21-3,
R4 is a resistance value of the strain gauge 21-4,
and R1=R2=R3=R4=R in a state in which the torque is not applied to the torque sensor 10.

FIG. 9(a) shows the variation in resistance value of the bridge circuit 40 in a case where the torque is applied to the torque sensor 10 as shown in FIG. 7(a), and FIG. 9(b) shows the variation in resistance value of the bridge circuit 40 in a case where, for example, the thrust force in the X-axis direction is applied to the torque sensor 10 as shown in FIG. 7(b). In FIG. 9(a) and FIG. 9(b), ΔR is the value of variation in the resistance.

FIG. 10 shows results of obtaining the output voltage Vout of the torque sensor 10 under different conditions (1) to (6) from the equation (1).

In FIG. 10,
(1) is a case where neither torque nor thrust force is applied to the torque sensor 10,
(2) is a case where the torque is applied to the torque sensor 10, (3) is a case where the thrust force is applied to the torque sensor 10, (4) is a case where a temperature variation ΔT is given to the strain gauges 21-1 and 21-2 of the torque sensor 10, (5) is a case where the torque is applied to the torque sensor 10 and the temperature variation ΔT is given to the strain gauges 21-1 and 21-2, and (6) is a case where the thrust force is applied to the torque sensor 10 and the temperature variation ΔT is given to the strain gauges 21-1 and 21-2.

In FIG. 10, R·(1+α·ΔT) indicates the resistance value at the time when the temperature coefficient of resistance is α and the temperature variation is ΔT.

Under each of the conditions represented in (1), (3), (4), and (6), the output voltage Vout of the torque sensor 10 is 0V. That is, when the thrust force is applied to the first structure 11 and the second structure 12, and/or when a temperature variation is applied to the strain gauges 21-1 and 21-2, the thrust force and the temperature variation are canceled and each output voltage Vout of the torque sensor 10 is 0V.

In addition, when the torque is applied to the torque sensor 10 represented in (2), and when the torque is applied to the torque sensor 10 represented in (5) and the temperature variation is given to the strain gauges 21-1 and 21-2, −ΔR/R·Vo is output as the output voltage Vout of the torque sensor 10. The output voltage Vout is a value which does not include temperature coefficient α or temperature change ΔT of the resistance. Therefore, the torque sensor 10 can offset the thrust force and the temperature variation and detect only the torque.

Effects of the Embodiments

According to the present embodiments, the first structure 11 and the second structure 12 are connected by the plurality of beams 13 and, furthermore, the first structure 11 and the second structure 12 are connected by the first strain generation part 14 and the second strain generation part 15. The thickness T1 of the plurality of beams 13 is set to be larger than the substantial thickness (thickness of the first strain body 16 and second strain body 17) T2 for obtaining the rigidity of the first strain generation part 14 and the second strain generation part 15. For this reason, the allowable torque of the torque sensor 10 and the mechanical strength of the torque sensor 10 are defined by the first structure 11, the second structure 12, and the beams 13. Therefore, the allowable torque of the torque sensor 10 and the mechanical force of the torque sensor 10 can be freely set as needed by changing the thickness T1 of the first structure 11, the second structure 12 and the beams 13, or changing the number of the beams 13.

In addition, the first strain generation part 14 is configured by the first protrusion 14a and the second protrusion 14b provided at the first structure 11 and the second structure body 12, respectively, and the first strain generation part 16 including the strain gauges 21-1 and 21-2 which connect the first protrusion 14a and the second protrusion 14b, and the second strain generation part 15 is configured by the third protrusion 15a and the fourth protrusion 15b provided at the first structure 11 and the second structure body 12, respectively, and the second strain generation part 17 provided with the strain gauges 21-3 and 21-4 which connect the third protrusion 15a and the fourth protrusion 15b. The first strain body 16 and the second strain body 17 are independent of the first structure 11, the second structure 12, the plurality of beams 13, the first protrusion 14a, the second protrusion 14b, the third protrusion 15a, and the fourth protrusion 15b.

For this reason, the size including the shape, thickness and/or width of the first strain body 16 and the second strain body 17 can be set freely.

Furthermore, the first strain body 16 and the second strain body 17 are independent of the first structure 11, the second structure 12, the plurality of beams 13, the first protrusion 14a, the second protrusion 14b, the third protrusion 15a, and the fourth protrusion 15b. For this reason, the sensitivity and size of the strain gauges 21-1, 21-2, 21-3, and 21-4 provided on the first strain body 16 and the second strain body 17 can be set in accordance with the size of the first strain body 16 and the second strain body 17. Therefore, the sensitivity and the size of the strain gauges 21-1, 21-2, 21-3, and 21-4 can be set easily.

In addition, the length L1 of the first gap provided between the first protrusion 14a and the second protrusion 14b of the first strain generation part 14, and the length L1 of the second gap provided between the third protrusion 15a and the fourth protrusion 15b of the second strain generation part 15 are shorter than the length L2 of the first protrusion 14a, the second protrusion 14b, the third protrusion 15a, and the fourth protrusion 15b, and the length L2 of the first protrusion 14a, the second protrusion 14b, the third protrusion 15a and the fourth protrusion 15b is shorter than the length L3 of the plurality of beams 13. For this reason, the first strain generating part 14 and the second strain generating part 15 can generate strain larger than the strain of the beams 13.

Moreover, since the first straining body 16 and the second straining body 17 can generate a large strain as compared with the beams 13, the gains of the strain gauges 21-1, 21-2, 21-3, and 21-4 provided at the first straining body 16 and the second straining body 17 can be made larger. Therefore, resistance to noise and detection accuracy of torque can be improved.

In addition, the first strain body 16 is configured separately from the first protrusion 14a and the second protrusion 14b, and the second strain body 17 is configured separately from the third protrusion 15a and the fourth protrusion 15b. For this reason, the fine strain gauges 21-1, 21-2, 21-3, and 21-4 can easily be formed on the first strain body 16 and the second strain body 17.

Furthermore, the torque sensor 10 can be configured by attaching the first strain body 16 provided with the strain gauges 21-1 and 21-2 to the first protrusion 14a and the second protrusion 14b of the first strain generation part 14, and attaching the second strain body 17 provided with the strain gauges 21-3 and 21-4 to the third protrusion 15a and the fourth protrusion 15b of the second strain generation part 15. For this reason, the torque sensor 10 can be manufactured easily.

Furthermore, the first strain generation part 14 provided with the first strain body 16 and the second strain generation part 15 provided with the second strain body 17 are arranged at positions symmetrical with respect to the centers of the first structure 11 and the second structure 12. For this reason, the thrust force can be offset and the only torque can be detected.

Moreover, a pair of strain gauges 21-1 and 21-2 are provided at the first strain body 16, and a pair of strain gauges 21-3 and 21-4 are provided at the second strain body 17, and a bridge circuit 40 is composed of strain gauges 21-1, 21-2, 21-3, and 21-4. For this reason, the influence of the temperature coefficient of the strain gauges 21-1, 21-2, 21-3, and 21-4 can be offset.

In addition, the second structure 12 includes a hollow portion 12a in the first structure 11 and the second structure 12 arranged concentrically. For this reason, a plurality of strain gauge wirings, and wirings necessary for control of a robot can be passed through the hollow portion 12a, and space can be used effectively.

In the present embodiment, the first structure 11 and the second structure 12 are arranged concentrically, and the first structure 11 and the second structure 12 are connected by the plurality of beams 13. However, the present invention is not limited to this, but can employ the following configuration.

For example, the first structure and the second structure are configured linearly, and the first structure and the second structure are arranged in parallel. The first structure and the second structure are connected by the plurality of beams. Furthermore, a first sensor unit having a strain body provided with a resistor, and a second sensor unit having the same configuration as the first sensor unit are disposed at central portions in the longitudinal direction of the first structure and the second structure, and the first structure and the second structure are connected by the first sensor unit and the second sensor unit. The first sensor unit and the second sensor unit are arranged at positions where the central portions in the longitudinal direction of the second structure of the first sensor unit and the second structure of the second sensor unit are located at an equal distance from the action center of the torque, and the first sensor unit and the second sensor unit are parallel to each other. That is, the strain body of the first sensor unit and the strain body of the second sensor unit are arranged at symmetrical positions with respect to the action center of the torque. Also in this configuration, the same effects as the above embodiment can be obtained.

In addition, the present invention is not limited to the above embodiments as it is, and at the implementation stage, the constituent elements can be modified and embodied without departing from the scope of the invention. In addition, various inventions can be formed by appropriate combinations of a plurality of constituent elements disclosed in the above embodiments. For example, some components may be deleted from all the components shown in the embodiment. Furthermore, components in different embodiments may be combined as appropriate.

What is claimed is:

1. A torque sensor comprising a first region, a second region, and a plurality of third regions connecting the first region and the second region, and a torque to be measured being transmitted between the first region and the second region via the third region, the torque sensor comprising:
   a first strain generation part provided between the first region and the second region and provided with a first resistor; and
   a second strain generation part provided at a position separate from the first strain generation part, between the first region and the second region, and provided with a second resistor, wherein
   the first strain generation part comprises a first protrusion protruding from the first region, a second protrusion protruding from the second region, a first gap provided between the first protrusion and the second protrusion, and a first strain body provided with the first resistor, wherein a first end of the first strain body is provided on a surface of the first protrusion and a second end of the first strain body is provided on a surface of the second protrusion; and
   the second strain generation part comprises a third protrusion protruding from the first region, a fourth protrusion protruding from the second region, a second gap provided between the third protrusion and the fourth protrusion, and a second strain body provided with the second resistor, wherein a third end of the second strain body is provided on a surface of the third protrusion and a fourth end of the second strain body is provided on a surface of the fourth protrusion.

2. The torque sensor of claim 1, wherein the plurality of third regions have a first thickness, and the first strain generation part and the second strain generation part have a second thickness smaller than the first thickness.

3. The torque sensor of claim 1, wherein the first strain generation part and the second strain generation part are arranged at positions symmetrical with respect to a center of action of the torque in the first region and the second region.

4. The torque sensor of claim 1, wherein the first resistor provided at the first strain body includes a first strain gauge and a second strain gauge, the second resistor provided at the second strain body includes a third strain gauge and a fourth strain gauge, and a bridge circuit is composed of the first strain gauge, the second strain gauge, the third strain gauge, and the fourth strain gauge.

5. The torque sensor of claim 1, wherein each of a total length of the first protrusion and the second protrusion, and a total length of the third protrusion and the fourth protrusion is shorter than a length of each of the plurality of third regions.

6. The torque sensor of claim 1, wherein the first region and the second region have an annular shape, and the second region comprises a hollow portion.

7. The torque sensor of claim 1, wherein the first protrusion and the second protrusion comprises a first accommodation part accommodating the first strain body, and the third protrusion and the fourth protrusion comprises a second accommodation part accommodating the second strain body.

8. The torque sensor of claim 1, wherein the first protrusion and the second protrusion are separated from each other, and the first strain body is provided between the first protrusion and the second protrusion.

9. The torque sensor of claim 1, wherein the third protrusion and the fourth protrusion are separated from each other, and the second strain body is provided between the third protrusion and the fourth protrusion.

10. A torque sensor comprising:
a first region;
a second region;
a plurality of third regions connecting the first region and the second region;
a first protrusion provided on the first region;
a second protrusion provided on the second region, and separated from the first protrusion by a first gap;
a third protrusion provided on the first region;
a fourth protrusion provided on the second region, and separated from the third protrusion by a second gap;
a first strain body provided between the first protrusion and the second protrusion;
a second strain body provided between the third protrusion and the fourth protrusion;
a first resistor provided on the first strain body; and
a second resistor provided on the second strain body.

11. The torque sensor of claim 10, wherein
the first resistor provided at the first strain body includes a first strain gauge and a second strain gauge, the second resistor provided at the second strain body includes a third strain gauge and a fourth strain gauge, and a bridge circuit is composed of the first strain gauge, the second strain gauge, the third strain gauge, and the fourth strain gauge.

12. The torque sensor of claim 10, wherein
each of a total length of the first protrusion and the second protrusion, and a total length of the third protrusion and the fourth protrusion is shorter than a length of each of the plurality of third regions.

13. The torque sensor of claim 10, wherein
the first region and the second region have an annular shape, and the second region comprises a hollow portion.

* * * * *